J. BURKE.
DYNAMO ELECTRIC MACHINE.
APPLICATION FILED APR. 23, 1917.

1,361,363.

Patented Dec. 7, 1920.

James Burke  Inventor
By his Attorneys,
Edwards, Sager & Richmond.

UNITED STATES PATENT OFFICE.

JAMES BURKE, OF ERIE, PENNSYLVANIA, ASSIGNOR TO BURKE ELECTRIC COMPANY, A CORPORATION OF PENNSYLVANIA.

DYNAMO-ELECTRIC MACHINE.

1,361,363.   Specification of Letters Patent.   Patented Dec. 7, 1920.

Application filed April 23, 1917. Serial No. 163,825.

*To all whom it may concern:*

Be it known that I, JAMES BURKE, a citizen of the United States, residing at Erie, in the county of Erie and State of Pennsylvania, have invented certain new and useful Improvements in Dynamo-Electric Machines, of which the following is a specification.

In dynamo electric machines, compensating windings have been used located in slots in the faces of the field poles for neutralizing the distortion of the field caused by currents in the armature winding. Also commutating poles have been used located between the main poles of the machine for producing a commutating field to assist in proper commutation of current in the armature coils when passing through the neutral position. The present invention relates particularly to an improved construction in compensated machines with commutating poles.

One object of this invention is to simplify and conveniently locate the windings which serve as compensating windings and also for exciting the commutating poles. Another object is to provide a construction which will enable the field frame to be separated without the necessity of removing the windings from the poles or breaking a large number of connections of the windings of the commutating poles and of the compensating windings. Other objects and advantages of my invention will be understood from the following description.

Figure 1:
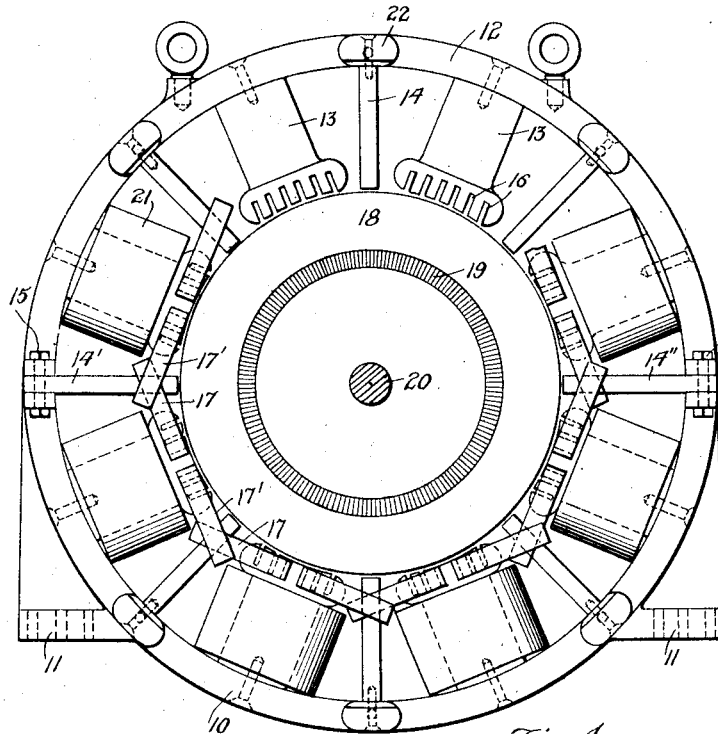
Figure 2:
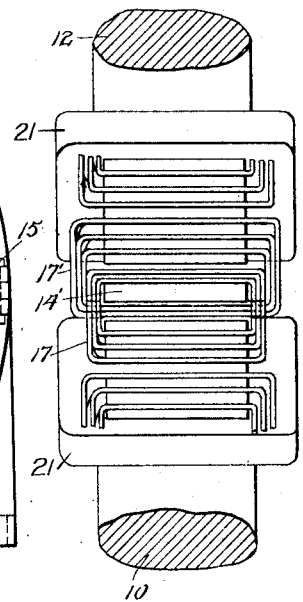

Figure 1 is a side elevation of one form of field frame embodying my invention and illustrating the main poles and commutating poles, some of the poles being illustrated unwound for clearness. Fig. 2 is an elevation of the faces of a part of the field poles and of a commutating pole showing the windings in position, and Fig. 3 is a diagram illustrating the electrical connections and relative direction of current in the compensating and commutating pole windings.

Referring to Figs. 1 and 2, the lower half of the field frame is indicated at 10 having supports 11. The upper half of the field frame 12 is separable from the lower half but is spaced therefrom as hereinafter explained. The particular machine illustrated has eight main field poles 13 and eight intervening commutating poles 14. These poles are secured to the field frame in any suitable manner, such as by bolts passing through the main frame and into the outer portion of the pole cores, excepting the commutating poles 14' and 14'', which are made longer than the other poles so as to extend into or through the field frame between the upper and lower halves of the field frame as shown in Fig. 1. These poles 14' and 14'' therefore serve to space the two halves of the field frame somewhat from each other, the bolts 15 which secure the two halves of the field frame together passing through or at the sides of the outer ends of these two poles. It is evident that when the bolts 15 are removed and the upper half of the field frame is slightly lifted from the poles 14' and 14'', the latter may be removed by pulling them outwardly.

The faces of the main poles have slots or perforations 16 extending in a direction parallel with the axis of the machine. In these slots are located the compensating windings in sets 17, 17'. Each main pole is shown as having six slots and one set of windings 17 occupy one-half of the slots in each main pole and such windings also embrace the adjoining commutating pole. Another set of windings 17' occupy the slots in the remaining half of each main pole and similarly pass around and include within its turns the respective adjoining commutating pole, as shown in Figs. 1 and 2. Certain of the windings, such as the set 17' are somewhat expanded so as to permit the windings 17 on the adjoining main pole to have space to pass within the turns of winding 17' where they both pass around the intervening commutating pole.

Figure 3:
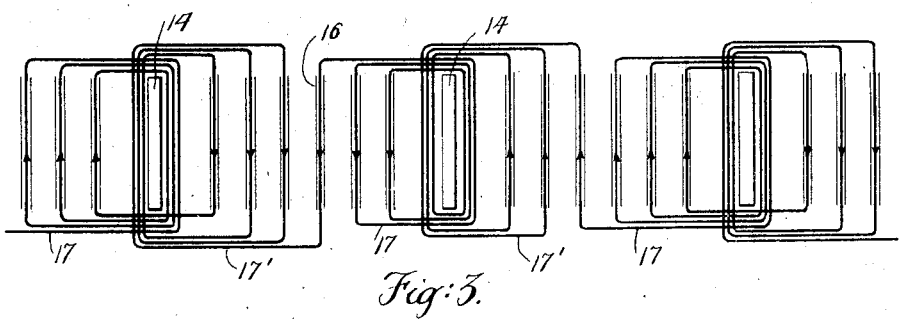

Referring to Fig. 3, showing development of the windings of a few of the poles, the slots in the faces of the main poles are indicated at 16 and the faces of the commutating poles at 14. The sets of windings 17, 17' are also indicated as occupying the slots in the main poles and as embracing the commutating poles and their electrical connections indicated so as to secure the same direction of current flow in the conductors of all the slots of alternate main poles, and the opposite direction of current in all the intermediate main poles. It will also be seen by following the connections in Fig. 3 that the windings 17, 17' are cumulative in their excitation of each commutating pole, the direction of the current being such that each succeeding commutating pole has opposite polarity. It will be understood that although a single conductor is indicated in Fig. 3 as being located in each slot 16, yet any desired number of conductors or turns in each coil may be used for securing sufficient compensation and sufficient excitation of the commutating pole. It will thus be seen that the windings as shown and described compensate for the armature distortion of the field and also create a commutating field for securing proper commutation.

The armature is indicated in a general way at 18 having a commutator 19 and shaft 20. Projections 22 from the side of the field frame are bearing brackets for supporting the brush ring.

It is apparent that the machine can be readily assembled and disassembled without disturbing or disarranging any of the windings. Thus in assembling, each half of the field frame may be completely wound with the compensating windings 17, 17' and with the shunt windings 21 and series windings if desired, and after the lower frame is positioned, the upper half of the frame is lowered until the windings 17, 17' which extend from the two halves of the frame, interlink with each other as above described. The commutating poles 14', 14'' are then pushed in between the two halves of the frame and through the overlapped portions of the windings 17, 17' and when in proper position the upper half of the field frame is released and permitted to engage these commutating poles. The bolts 15 are then inserted. In disassembling, the reverse procedure is followed, the bolts 15 being removed and after the weight is removed from the poles 14', 14'', they are withdrawn outwardly, after which the upper half of the field frame may be raised, the interlinked windings 17, 17' in the plane of separation of the machine being then freely separable.

Although I have described one embodiment of my invention, it is evident that various modifications may be made without departing from the scope thereof, and the degree of compensation from partial compensation to over compensation may be controlled as desired by suitable proportioning of the windings.

I claim :—

1. In a dynamo electric machine of the compensated type, the combination of main poles having slotted faces, commutating poles located between the main poles, and compensating windings located in the slots of the main poles and also embracing said commutating poles in each loop thereof, one side of each loop being close to the respective commutating pole embraced thereby.

2. In a dynamo electric machine of the compensated type, the combination of main poles having slotted faces, commutating poles located between the main poles, and compensating windings located in the slots of the main poles, the windings on one-half of a main pole embracing closely within its turns the commutating pole on one side of the main pole and the windings on the other half of the main pole embracing closely within its turns the commutating pole on the other side of the main pole.

3. In a dynamo electric machine of the compensated type having a separable field frame, the combination of main poles and commutating poles, and windings embracing each commutating pole and parts of the adjacent main poles, at least one of said commutating poles being located in the plane of separation of said frame and extending between the separable portions of said frame.

4. In a dynamo electric machine of the compensated type having a separable field frame, the combination of main poles, commutating poles, at least one of said commutating poles being located in the plane of separation of said frame and extending between the separable portions of said frame, and compensating coils embracing said commutating poles and also engaging said main poles, each of said coils which engage a commutating pole located in the plane of separation of said frame engaging respectively only one adjacent main pole.

5. In a dynamo electric machine of the compensated type having a separable field frame, the combination of main poles having slotted faces, commutating poles between said main poles, compensating coils located in the slots of the main poles and embracing in their turns the said commutating poles, certain of said commutating poles extending between separable portions of said field frame, and each of said coils which embrace said last named commutating poles being located respectively in slots of only one adjacent main pole.

6. In a dynamo electric machine of the compensated type, the combination of main poles having slotted faces, commutating poles located between the main poles and compensating windings, one side of each turn of said compensating windings being located in a slot of the main pole, and the other side of the same turn closely embracing the nearest commutating pole adjacent thereto.

7. In a dynamo electric machine of the compensated type having a separable field frame, the combination of main poles and commutating poles, compensating windings in slots on the main poles, said windings extending from the slots of each pole toward the adjacent main poles and lapping past the corresponding windings from those adjacent poles, said commutating poles locking into such overlapping windings and certain of said commutating poles extending between the separable portions of the frame whereby they may be withdrawn at an early stage to permit separation of the windings when the field frame is separated.

8. In a dynamo electric machine of the compensated type having a separable field frame, the combination of main poles, commutating poles, certain of said commutating poles being removable and located in the plane of separation of said frame, compensating coils embracing said commutating poles and also engaging said main poles, and each of said coils which embrace said last named commutating poles engaging respectively only one adjacent main pole.

9. In a dynamo electric machine of the compensated type, a field frame comprising main poles and commutating poles alternately arranged, and windings on said main poles, certain turns thereof being extended to embrace closely the adjacent commutating poles, said frame being made separable at certain of said commutating poles and said commutating poles being made removable from the field frame and from the coils embracing them to facilitate separation of the frame leaving the windings on the main poles.

JAMES BURKE.